United States Patent [19]
Gillham

[11] 3,807,473
[45] Apr. 30, 1974

[54] ANTI-SKID TIRE COVER

[76] Inventor: Lewis W. Gillham, R.R. 1, Sharon, Ontario, Canada

[22] Filed: Sept. 18, 1972

[21] Appl. No.: 290,163

[30] Foreign Application Priority Data
Jan. 10, 1972 Canada .............................. 132059

[52] U.S. Cl. .............................. 152/190, 152/180
[51] Int. Cl. .......................................... B60c 27/06
[58] Field of Search .......... 152/178, 180, 181, 185, 152/186, 190

[56] References Cited
UNITED STATES PATENTS

| | | | |
|---|---|---|---|
| 1,415,444 | 5/1922 | Hibner | 152/181 |
| 1,371,019 | 3/1921 | Connolly et al. | 152/180 |
| 1,766,531 | 6/1930 | Peterson | 152/180 |
| 1,056,642 | 3/1913 | Deonier | 152/181 |
| 1,314,946 | 9/1919 | Champion | 152/181 |

Primary Examiner—Drayton E. Hoffman
Attorney, Agent, or Firm—Stanley E. Johnson

[57] ABSTRACT

An anti-skid tire cover which comprises a plurality of individual channel members arranged circumferentially end-to-end in overlapping relationship, each having a central longitudinal V-shaped ridge portion formed integrally therewith and projecting outwardly therefrom. The overlapping portions of the ridges on adjacent members are hingedly interconnected by pins or like members, the overlapping of the ridge maintaining alignment of adjacent members. Tightening means are provided having cooperating portions on respective ones of two adjacent channel members detachably interconnecting the same and providing means for adjusting the amount of overlap. Wheel attaching means are provided on selected ones of the channel members on opposite sides thereof to removably secure the cover to a wheel of a vehicle.

2 Claims, 4 Drawing Figures

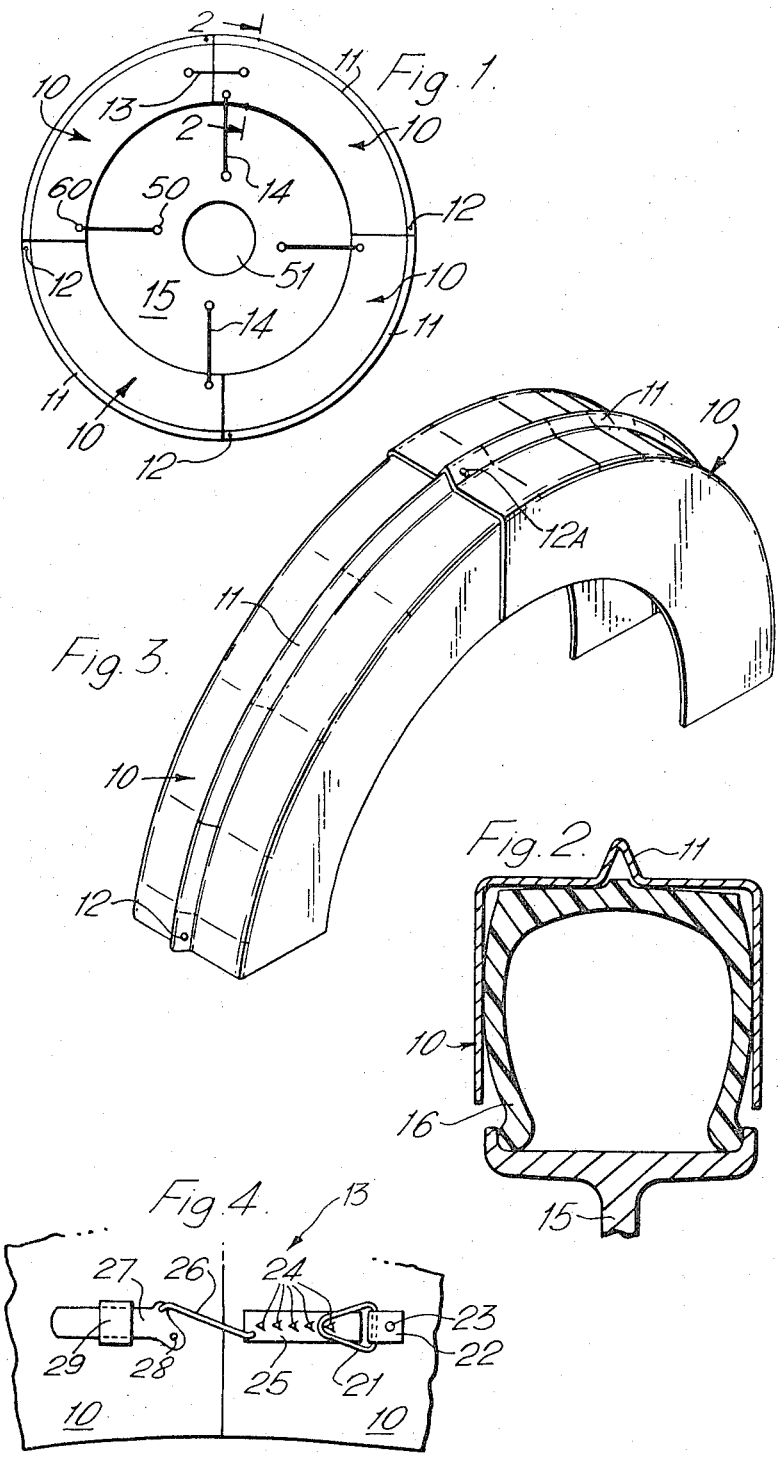

ANTI-SKID TIRE COVER

This invention relates to anti-skid tire covers, and more particularly to tire covers for use on the front wheels of farm and garden tractors.

Many solutions have been proposed for solving the problem of preventing skidding on slippery surfaces and of increasing traction on muddy terrain. In one solution as set forth in Canadian Pat. 123,488 issued Feb. 1, 1910 to E. M. Boughtin et al., the anti-skid armour for tires included transverse rows of cogs arranged in parallel on the outer circumference of armour sections in order to achieve traction. This construction suffers from the requirement of individually securing the cogs to the armour sections. Similarly, Canadian Pat. 188,999 issued Mar. 4, 1919 to P. Sangoff, proposed an anti-skid armour for tires comprising a plurality of arcuate plates having a plurality of spurs attached to the outer surface thereof. This arrangement required the provision of separate spurs which were screwed into the plate members and thus there is a considerable likelihood of spurs loosening in the course of use of the armour. A further alleged improvement was provided in U.S. Pat. No. 1,371,019 issued Mar. 8, 1921 to A. Connolly et al., which proposed an anti-skid armour for pneumatic tires wherein the individual sections were hingedly interconnected, the sections comprising pairs of ribs united by a medial longitudinal rib. This structure does not provide a fine adjustment for fitting the armour on different wheel sizes since provision is made only for an abutting of the individual sections.

Accordingly, an object of the invention is to provide an anti-skid tire cover which is simple in construction and can be adjusted to fit over various sizes or manufactured to suit various cross-sectional shapes of tires.

A further object of the invention is to provide an anti-skid tire cover which can easily be removably attached to a wheel of a vehicle.

By a broad aspect of the invention, an anti-skid tire cover is provided comprising a plurality of individual arcuate members, channel shaped in cross-section, arranged circumferentially end-to-end, each said member having a longitudinally extending V-shaped ridge portion formed integrally therewith and projecting outwardly therefrom, said ridges being disposed in alignment circumferentially around the tire cover and in overlapping relation on adjacent members, and means hingedly interconnecting adjacent members.

Tightening means are provided having cooperating portions on respective ones of two adjacent channel members detachably interconnecting the same. Further, attaching means are provided on selected ones of the channel members for removably securing the cover to a wheel of a vehicle.

In a preferred embodiment, the anti-skid tire cover comprises four channel members formed of sheet steel, or any other suitable material, shaped to fit snugly over the outer tire surface. The V-shaped ridge portion, formed integrally with each channel member, is provided with an aperture at each end for receiving a pin. In assembly, the channel members overlap a desired amount and are kept in alignment through the similarly overlapping ridge portions hingedly interconnected by respective pins.

In order to fine adjust the amount of overlap of the channel members, depending on the size of the wheel on which the tire cover is to be mounted, over-center tighteners are provided on each longitudinal side portion of the channel members, one end of each tightener being pivotally attached adjacent one end of a channel member, the other pivotally attached adjacent one end of another channel member with means for detachably interconnecting the same.

The tire cover is removably secured to the wheel by means of wheel attaching arms extending on both sides of the cover from the lower edge of the channel members to an aperture provided adjacent the hub of the wheel for receiving the other end of the arm. The structure of the wheel attaching arms may be similar to that of the over-center tighteners affording a quick connect and disconnect arrangement and, at the same time, providing sufficient strength and tension for holding the time cover securely on the wheel of a vehicle.

In the drawings,

FIG. 1 is a schematic elevational view of the time cover mounted on a wheel;

FIG. 2 is a partial section along lines 2—2 of FIG. 1;

FIG. 3 is a perspective view of two overlapping sections of the tire cover; and

FIG. 4 is an elevational view of an over-center tightener.

As seen in FIGS. 1 to 3, the tire cover according to the invention comprises a plurality (four shown in FIG. 1) of arcuate members 10, each of which is channel shaped in cross-section and provided with a V-shaped ridge portion 11 formed integrally therewith and projecting outwardly therefrom. The channel members 10 cover the outer tire surface 16 of a wheel 15 and the ridge portions extend circumferentially therearound. For the purpose of greater strength and in order to adjust the tire cover to fit over various wheel sizes, the individual channel members 10 overlap a desired amount. An aperture 12 is provided at both ends of each central ridge portion 11 for receiving a pin 12A. In assembly, the apertures of two overlapping ridge portions 11 are aligned for insertion of the pin 12A, thus providing a hinged interconnection between two adjacent channel members and, at the same time, maintaining the channel members in alignment. By increasing or decreasing, within limits dictated by the curvature of the channels, the amount of overlap, the tire cover can fit over various wheel sizes.

Over center tighteners 13 are arranged respectively on opposite sides of the tire cover interconnecting two overlapping channel members 10. The over-center tightener according to FIG. 4 includes a triangular loop element 21 pivotally attached to a strap 22 which in turn is pivotally attached adjacent one end of one member 10 by means of a pivot pin 23 or like member. Loop 21 is adapted to engage one of a plurality of hooks 24 on a strap 25 connected by a link 26 to a lever 27 which in turn is pivotally connected by a pin 28 to the opposite end of an adjacent channel member 10. The lever 27 is an over-center arrangement with the link and may be retained in a locked position by a clip 29 secured to the channel member 10 adjacent but spaced from pivot 28.

In order to tighten two overlapping channel members 10 when the tire cover is fitted over the tire 16 of wheel 15, loop 21 is placed over one of hooks 22 to provide a tight fit and then lever 27 is pivoted about pin 28 and locked in over-center position by clip 29.

The wheel attaching arms 14 may be of the same structure as the over-center tighteners 13 and provided on each side of, for example as shown, each channel member 10 for attaching the tire cover assembly to the wheel 15. Loop 21, through member 22, in such case may be attached to a wheel mounting stud 50 (FIG. 1) adjacent a hub 51 and the lever with the link and hook member pivotally attached as by a pin 60 to a channel member 10 adjacent an inner edge thereof. The tightening action for the wheel attaching arms is the same as described with regard to the over-center tighteners.

The over-center tighteners and wheel attaching arms may be replaced by any other suitable, adjustable quick connect and disconnect arrangement and, if desired, may include spring loading.

I claim:

1. An anti-skid tire cover comprising:
   a. a plurality of individual arcuate members each channel shaped in cross-section and arranged circumferentially in generally end-to-end relation, each of said members having a longitudinally extending V-shaped central portion formed integrally therewith and projecting outwardly therefrom circumferentially therearound providing a ridge on the outer surface of the member and a V-shaped channel on the inner surface, adjacent ones of said members being disposed in overlapping relation with the respective V-shaped portions in internested relationship;
   b. pin means passing through the overlapped V-shaped portions of each adjacent overlapped portions except one hingedly interconnecting such adjacent member; and
   c. a quick disconnect tightening means detachably interconnecting said except one of the overlapped portions, said means having cooperating portions on respective ones of the adjacent channel members detachably interconnecting the same.

2. An anti-skid tire cover as defined in claim 1 including additional attaching means on selected ones of said channel members for removably securing said cover to a wheel of a vehicle.

* * * * *